INVENTOR.
WILLIAM E. YOUNG
BY
Kenyon & Kenyon
ATTORNEYS

United States Patent Office 3,001,572
Patented Sept. 26, 1961

3,001,572
HEAT SEALING DEVICES
William E. Young, Ramsey, N.J., assignor to Standard Packaging Corporation, New York, N.Y., a corporation of Virginia
Filed July 24, 1956, Ser. No. 599,710
6 Claims. (Cl. 156—386)

This invention relates to heat sealing devices of the type used to heat seal bags or other containers along interfacing surfaces which are heat sealable. The heat sealing may be in connection with making the bags or containers or used for heat sealing the mouths or other openings after the bags or containers are loaded with the products packaged in them.

As an example of the bag or container material, cellophane having a layer of polyethylene on one side is frequently used today for the manufacture of bags or containers formed by heat sealing the polyethylene surfaces together. In the case of a bag, a mouth is left open through which the product may be passed into the bag after which the mouth is heat sealed closed to provide a package. In the case of a container, it is possible to form the container itself while enclosing the product, the container being heat sealed with its heat sealable surfaces together. In all of these and in other instances a heat sealing device must be used to heat seal the material.

Heat sealing devices are in various forms but essentially they comprise a heated bar which is pressed against the two sheets of material on one side while the opposite side of the sheets is held by a suitable support. This bar may be heated in various fashions, electric resistance heating being a common way to do this. The surface of the bar which provides the heat sealing heat and pressure surface, is usually finished very smoothly if not actually polished, for the purpose of preventing the heat sealing bar surface from picking up contamination. The working surface of the bar, or of any other tool used for the same purpose, must be kept clean because contamination not only provides a rough surface but functions as a heat insulator so that the resulting seal is not formed uniformly throughout. Dirt and contamination usually form a leaky seal.

As an example of the trouble caused by contamination of the heat sealing bar, pickles, wet-packed in brine, were being heat sealed in laminated cellophane-polyethylene bags. Trouble came when the heat sealing bars softened the pouches, contaminating material then building up on the working surfaces of the bars and forcing a shut-down every few minutes to clean it off. The pickles were being packed by means of heat sealing machines of a popular type.

With the above in mind, the primary object of the present invention, is to provide a means for overcoming or remedying such situations in a manner which is permanent insofar as the heat sealing machine user is concerned. Such a user is generally a food product packer of one kind or another and does not ordinarily have adequately trained technical personnel or facilities required to keep a heat sealing machine in operation. It is necessary to make such a machine as trouble-free as possible and, of course, the heat sealing device or devices incorporated by such a machine are of great importance.

According to the present invention the surface of the tool of the heat sealing device, which presses against the heat sealable material, is provided with a layer which then provides the surface applying the heat and pressure. The tool is, of course, provided with a heating means to heat its surface and this heat must carry through the layer to the heat sealable material. One surface of this layer faces the tool's surface and the other surface of the layer faces outwardly so as to press against the heat sealable material. Means are provided for removably attaching this layer to the tool's surface so that the layer may be removed and replaced by a new layer whenever it is necessary or advisable. This layer, which ordinarily has a shape and extent sufficient to completely cover the tool's surface, has a coating on its surface which contacts the heat sealable material and this coating is of such characteristic as to be substantially less adherent with respect to contamination than the tool's surface. Certain coatings are known to have this characteristic and can be coated directly on the heat sealing bar's surface but with long usage even such a coating becomes contaminated. When applied directly to the tool's surface the tool or the entire heat sealing device usually must be returned for reconditioning by the manufacturer of the heat sealing machine. With the present invention the unskilled user of the machine can remove the layer and replace it with a new layer of the same kind.

The described layer must provide a base or support for the coating which retards the contamination-pickup. Therefore, this base is made from metal, aluminum foil being used in the commercialized form of this invention. The means for holding the layer to the tool's surface comprises a pressure-sensitive adhesive of the type which is resistant to the elevated temperatures required for heat sealing.

In other words, a plain heat sealing bar may be provided with a tape comprising the base or support of metal foil, the pressure-sensitive adhesive on one side of this tape which permits the tape to be removably adhered to the heat sealing bar's working face, and the foil having on what is its working face, the coating of material which retards or resists the adherence of material picked up from the heat sealable material or otherwise. Anyone can peel off this tape and replace it with a new piece of tape. The bar need not be returned to its manufacturer as in the case of the contamination resisting coating applied directly to the heat sealing bar.

The use of the metal foil not only provides the necessary heat continuity but has the additional advantage that it may be impressed with indicia so that it acts like a printer. For example, the described tape may be placed in a typewriter and made into a printer which then not only has the advantages previously described when in use on the heat sealing bar, but also serves to print directly into the heat seal. In this way packages may be coded, for example. The impression in the heat sealed area is not conspicuous but it is plain enough to be detected easily.

A specific example of the invention is illustrated by the accompanying drawings in which.

Figure 1:
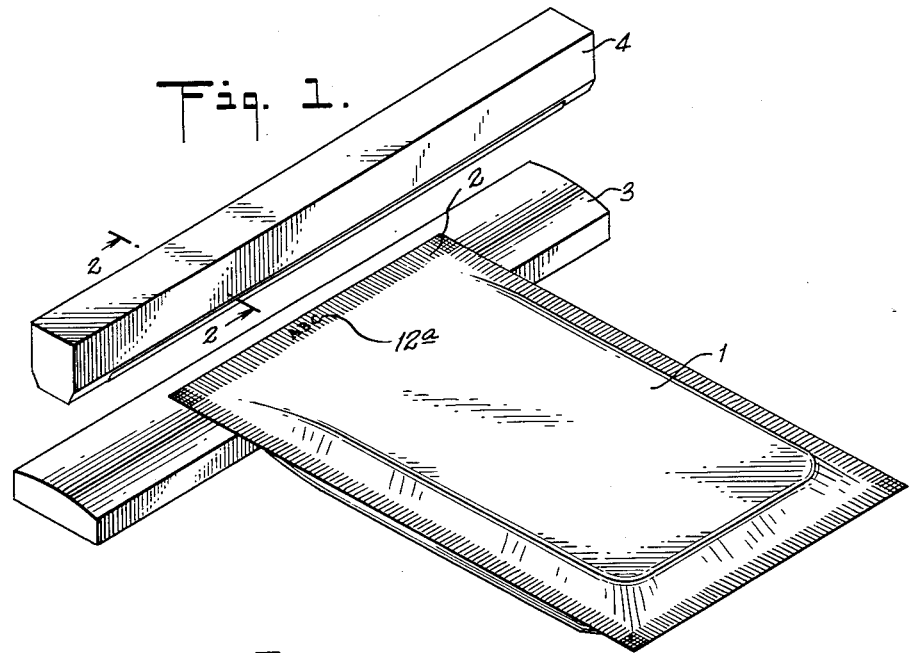
FIG. 1 shows a bag being heat sealed closed by the device of the present invention.

These drawings show a pouch or bag 1 which may be made of a cellophane-polyethylene laminate with the polyethylene side on the inside of the bag so that the mouth portion 2 is heat sealable. This mouth portion is shown resting on a suitable support 3. The heat sealing bar 4 is shown above the support 3 and as internally having electric resistance heating means 5. This bar or tool has a lower surface 6 which is flat and extends the length of the bar, the vertical sides of the bar joining with this surface through bevels 7.

The bar 4, suitably heated, is moved downwardly by any suitable means so as to momentarily press tightly on the mouth of the bag, this heat sealing the mouth closed and the bar 4 then lifting. All bag making, container making, and packaging machines of the heat sealing type use an arrangement such as this in one form or another. The bars may be arranged horizontally, vertically, or otherwise.

As previously explained, the surface 6 tends to pick up material from the bag 1. This may be either particles of the cellophane, contamination on the bag mouth or practically anything which can stick or adhere to the surface 6. This produces the condition preventing the uniform pressure and heat transfer required to produce an effective heat seal.

The invention is shown in its tape form. The foil base or support 8 is shown as the aluminum foil. The foil .003" thick has proven to be suitable.

The coating 9 may be a coating .001" thick of "Teflon" which is a tetrafluoroethylene resin enamel produced by E. I. duPont de Nemours & Company. This resin may be made into a stable dispersion in water and applied to the foil tape 8 by spraying, after which baking sets the resin into its enamel form. As is well known, this kind of enamel is inert to all known commercial solvents, has a low co-efficient of friction and low permeability to moisture vapor. Very few things will stick to such an enamel but even so it does accumulate contamination after long use.

The pressure-sensitive adhesive 10, which causes the tape to adhere to the surface 6, must be one of the types which remains operative at the elevated temperatures required for heat sealing. Such high-temperature pressure-sensitive adhesives are available commercially. Usually they are of the silicone type. Their character is complex and since they are commercially available a detailed disclosure of their nature is considered to be undesirable. This pressure-sensitive adhesive coating 10 may be about .001" thick.

Figure 3:
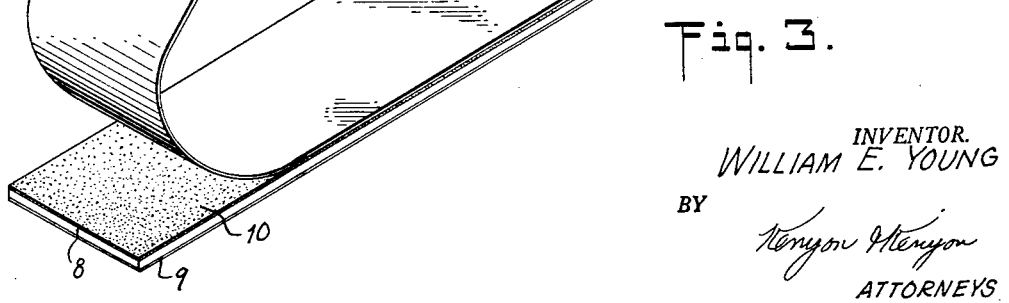
FIG. 3 shows the tape itself.

The pressure-sensitive adhesive 10 may be covered by a strip of .001" thick cellophane, shown at 11, in FIG. 3. This is for convenience in connection with merchandising and otherwise handling the tape prior to its actual use. Preferably the cellophane is of the non-waterproof type so that by moistening it slightly it may be easily peeled from the coating 10 when the tape is to be applied to the heat sealing bar.

Figure 2:
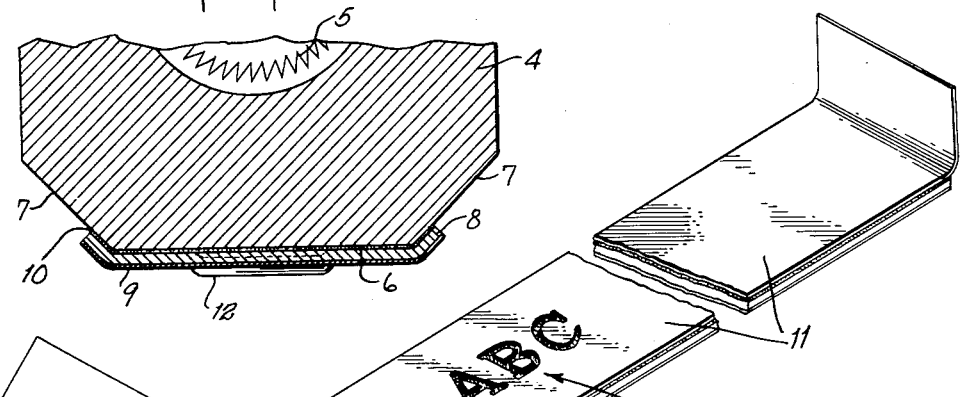
FIG. 2 is a cross section taken on the line 2—2 in FIG. 1.

As shown by FIG. 2 the new tape of the present invention is preferably somewhat wider than the width of the surface 6 so that the tape may be bent up against the bevels 7. This provides for a firmer anchorage of the tape and is generally considered to be desirable.

In FIG. 3 the typed indicia is shown at 12. This is somewhat difficult to illustrate but it is easy to visualize it when it is considered that the tape is merely placed into a typewriter like a stencil for mimeographing. FIG. 1 shows the impression, at 12a, as it is formed in the heat seal. The actual impression takes the form of a depression in the heat sealed area and since the cellophane and polyethylene are transparent, the impression can be seen most easily when viewed with the aid of an offset light source. Under the proper conditions the impression is clearly visible so that it may be read by inspectors or other interested persons. The impression is inconspicuous and does not detract in any way from the appearance of the package insofar as the package buyer is concerned. The tape is malleable and ductile, as to its foil component, so by typing on it it is embossed to form a printer. Other means for embossing indicia into the tape may be used.

I claim:

1. A heat sealable material sealing device including a tool providing a surface adapted to press against said material, means for heating said surface, a layer, comprising a metal foil, arranged with one surface thereof facing said tool's surface and the other surface of said layer facing outwardly so as to press against said material, means for removably attaching said layer to said surface, and a coating on said layer's other surface, said coating being less adherent with respect to contamination than said tool's surface and being replaceable by removal of said layer and replacement thereof by a corresponding but unused layer.

2. A heat sealable material sealing device including a tool providing a surface adapted to press against said material, means for heating said surface, a layer, comprising a metal foil, arranged with one surface thereof facing said tool's surface and the other surface of said foil facing outwardly so as to press against said material, means for removably attaching said foil to said surface, and a coating on said foil's other surface, said coating being less adherent with respect to contamination than said tool's surface and being replaceable by removal of said foil and replacement thereof by a corresponding but unused foil, said foil having indicia formed therefrom in relief projecting beyond said other surface which contacts said material and forming indicia type for printing in said heat sealable material.

3. A heat sealable material sealing device including a tool providing a surface adapted to press against said material, means for heating said surface, a layer comprising a metal foil which provides high heat conductivity from said tool's surface to said heat sealable material, said metal foil arranged with one surface thereof facing said tool's surface and the other surface of said foil facing outwardly so as to press against said material, means for removably attaching said foil to said surface, and a coating on said foil's other surface which contacts said material, said coating being less adherent with respect to contamination than said tool's surface and being replaceable by removal of said foil and replacement thereof by a corresponding but unused foil, said attaching means comprising a heat-resistant pressure-sensitive adhesive coating on said foil's surface facing said tool's surface and joining these surfaces together in a separable manner.

4. A heat sealable material sealing device including a tool providing a surface adapted to press against said material, means for heating said surface, a metal foil arranged with one surface thereof facing said tool's surface and the other surface of said foil facing outward so as to press against said material, means for removably attaching said foil to said surface, and a coating on said foil's other surface, said coating composed of Teflon and being replaceable by removal of said foil and replacement thereof by a corresponding but unused foil.

5. A heat sealable material sealing device including a tool providing a surface adapted to press against said material, means for heating said surface, a metal foil arranged with one surface thereof facing said tool's surface and the other surface of said foil facing outwardly so as to press against said material, said foil being removably attached to said surface by a pressure sensitive adhesive, and a coating on said foil's other surface, said coating being less adherent with respect to contamination than said tool's surface and being replaceable by removal of said foil and replacement thereof by a corresponding but unused foil.

6. A heat sealable material sealing device including a tool providing a surface adapted to press against said material, means for heating said surface, a metal foil arranged with one surface thereof facing said tool's surface and the other surface of said foil facing outward so as to press against said material, said foil being removably attached to said surface by a pressure sensitive adhesive, and a coating on said foil's other surface which contains said material, said coating composed of Teflon and being replaceable by removal of said foil and replacement thereof by a corresponding but unused foil.

References Cited in the file of this patent

UNITED STATES PATENTS

| | | |
|---|---|---|
| 533,674 | Schram | Feb. 5, 1895 |
| 2,456,621 | Cheney | Dec. 21, 1948 |
| 2,556,008 | Spalding | June 5, 1951 |
| 2,601,336 | Smith-Johannsen | June 24, 1952 |
| 2,609,316 | Fichtner | Sept. 2, 1952 |
| 2,682,294 | Langer | June 29, 1954 |
| 2,714,416 | Fener | Aug. 2, 1955 |
| 2,743,761 | Snyder et al. | May 1, 1956 |
| 2,774,704 | Smith | Dec. 18, 1956 |
| 2,796,913 | Fener | June 25, 1957 |
| 2,834,395 | Russell et al. | May 13, 1958 |